United States Patent [19]

Chamay et al.

[11] B 3,988,889

[45] Nov. 2, 1976

[54] COWLING ARRANGEMENT FOR A TURBOFAN ENGINE

[75] Inventors: Anthony Joseph Chamay, Marblehead; James Smith, Topsfield; Thomas Neil Hull, Jr., Marblehead, all of Mass.

[73] Assignee: General Electric Company, Lynn, Mass.

[22] Filed: Feb. 25, 1974

[21] Appl. No.: 445,459

[44] Published under the second Trial Voluntary Protest Program on February 3, 1976 as document No. B 445,459.

[52] U.S. Cl. .............................. 60/226 A; 60/271; 239/265.39
[51] Int. Cl.² ...................... F02K 3/02; B64C 15/06
[58] Field of Search ................ 60/226 A, 229, 232, 60/271; 239/265.41, 265.43, 265.39, 265.33; 244/42 D, 42 DA; 92/92

[56] References Cited
UNITED STATES PATENTS

| | | |
|---|---|---|
| 3,047,257 | 7/1962 | Chester .......................... 244/42 DA |
| 3,082,792 | 3/1963 | Jenkins ............................ 92/101 X |
| 3,511,055 | 5/1970 | Timms .................................. 60/229 |
| 3,612,402 | 10/1971 | Timms et al. ............... 239/265.41 X |
| 3,747,341 | 7/1973 | Davis ................................. 60/226 A |
| 3,785,567 | 1/1974 | Fischer ........................ 239/265.39 |

Primary Examiner—Carlton R. Croyle
Assistant Examiner—Thomas I. Ross
Attorney, Agent, or Firm—James W. Johnson, Jr.; Derek P. Lawrence

[57] ABSTRACT

A cowling arrangement is provided for a turbofan engine of the variable pitch fan blade type wherein the aft portion of the fan cowling has the ability both to slide axially with respect to the main forward portion, providing an annular intake to increase reverse airflow during reverse pitch fan operation, and to vary radially so as to adjust exit area during normal operation at forward pitch.

9 Claims, 8 Drawing Figures

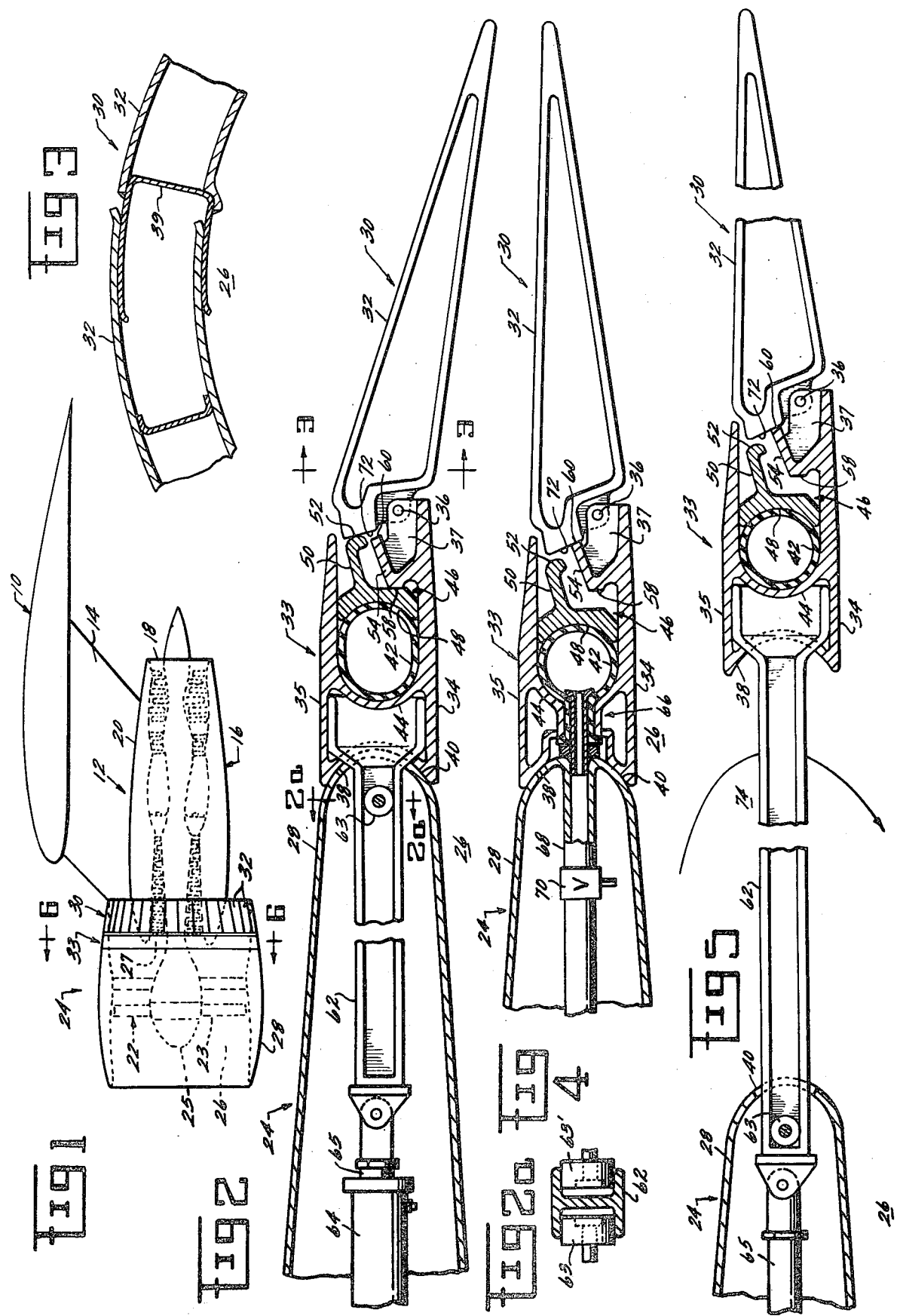

COWLING ARRANGEMENT FOR A TURBOFAN ENGINE

BACKGROUND OF THE INVENTION

In general, this invention relates to a cowling arrangement for a turbofan engine and, more particularly, to a variable cowling arrangement for a turbofan engine having variable pitch fan blades wherein an increased airflow can be admitted to the fan for improved performance efficiency during the reverse pitch mode of fan operation.

The new family of high bypass, large diameter, turbofan engines recently introduced into airline service have proved to be an economical and convenient means of propulsion for today's wide bodied aircraft which cruise subsonically. The high bypass engines have also demonstrated noise levels which are significantly lower than those of previous generation engines due to the reduced jet velocities of the airflow pressurized by the fan, while thrust levels have been increased as a direct result of the increased mass airflow through the fan. Even further increases in performance efficiency could be obtained if the fan speed could be varied to meet different engine operating requirements as dictated by the flight mission.

One means of varying the fan speed of a bypass turbofan engine without changing the rotational speed of the core engine is through the use of variable pitch fan blading. Such blading may be varied to cater to varying flight conditions and may be varied to reverse pitch for complete thrust reversal after the aircraft has landed. One difficulty which arises when the variable pitch fan blades are in reverse pitch for braking is that the airflow which is drawn into the fan from the rear may suffer some degree of distortion due to the turning of the airflow into the core engine compressor which still requires an inlet airflow for continued operation of the core engine. This distortion is due to the fact that the reverse pitch airflow passing forwardly must turn 180° in order to enter the core engine inlet. As a direct consequence of such distorted flow, there is an aerodynamic restricting, or nozzle effect, produced in the airflow before it reaches the variable pitch fan blades. Since the entry to the fan is so restricted, the reverse thrust produced by the variable pitch fan is less than it would otherwise be if this aerodynamic restriction could be eliminated or reduced.

One proposed solution to the aforementioned problem has involved the use of a two part cowling around the variable pitch fan wherein the aft portion of the cowling has the ability to slide axially rearwardly with respect to the main forward portion, thus providing an annular intake to increase the reverse airflow to the fan. However, not only is it desirable that the aft portion of the cowling be made translatable to accommodate an increased airflow during reverse pitch, but there must also be means for varying the exit area from the cowling during normal operation at forward pitch. This is necessary in order to accommodate for the variations in mass airflow through the fan during the various modes of flight operation such as takeoff, climb to altitude, cruise and descent from altitude.

Therefore it is a primary object of this invention to provide a cowling arrangement for a turbofan engine having variable pitch fan blades wherein an increased airflow can be provided to the fan during reverse pitch operation while the exit area from the fan cowling can be varied during forward pitch operation to accommodate for the variations in mass airflow through the fan.

It is also an object of this invention to provide a cowling arrangement for a turbofan engine having variable pitch fan blades wherein the aft portion of the fan cowling has the ability both to slide axially with respect to the main forward portion providing an annular intake to increase reverse airflow, and to vary radially so as to adjust exit area during normal operation at forward pitch.

SUMMARY OF THE INVENTION

These and other objects and advantages will become clearly understood from the following detailed description and drawings, all of which are intended to be representative of, rather than in any way limiting on, the scope of invention. A turbofan engine of the variable pitch fan type is provided with a two part fan cowling comprising a forward fixed portion and an aft variable portion. The aft variable portion includes a unison ring translatably disposed in relation to the downstream end of the fixed portion wherein a plurality of circumferentially spaced apart nozzle flaps are rotatably disposed around the unison ring. An inflatable bladder is disposed within the unison ring with an actuating ring section translatably disposed between the bladder and nozzle flaps so that inflation of the bladder operates to translate the actuating ring section rearwardly engaging the forward ends of the nozzle flaps while simultaneously rotating the nozzle flaps. Means are also provided for translating the variable portion apart from the fixed portion so as to provide an opening therebetween for the admission of reverse airflow.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a side view of a turbofan engine and its associated aircraft structure.

FIG. 2 is a partial cross-sectional view of the cowling around the fan portion of the turbofan engine of FIG. 1.

FIG. 2A is a cross-sectional view taken across the lines 2a—2a of FIG. 2.

FIG. 3 is a partial cross-sectional view taken across the lines 3—3 of FIG. 2.

FIG. 4 is a partial cross-sectional view of the cowling of FIG. 2 in a different mode of operation.

FIG. 5 is a partial cross-sectional view of the cowling of FIG. 2 in still another mode of operation.

DESCRIPTION OF THE PREFERRED EMBODIMENT

Figure 6:
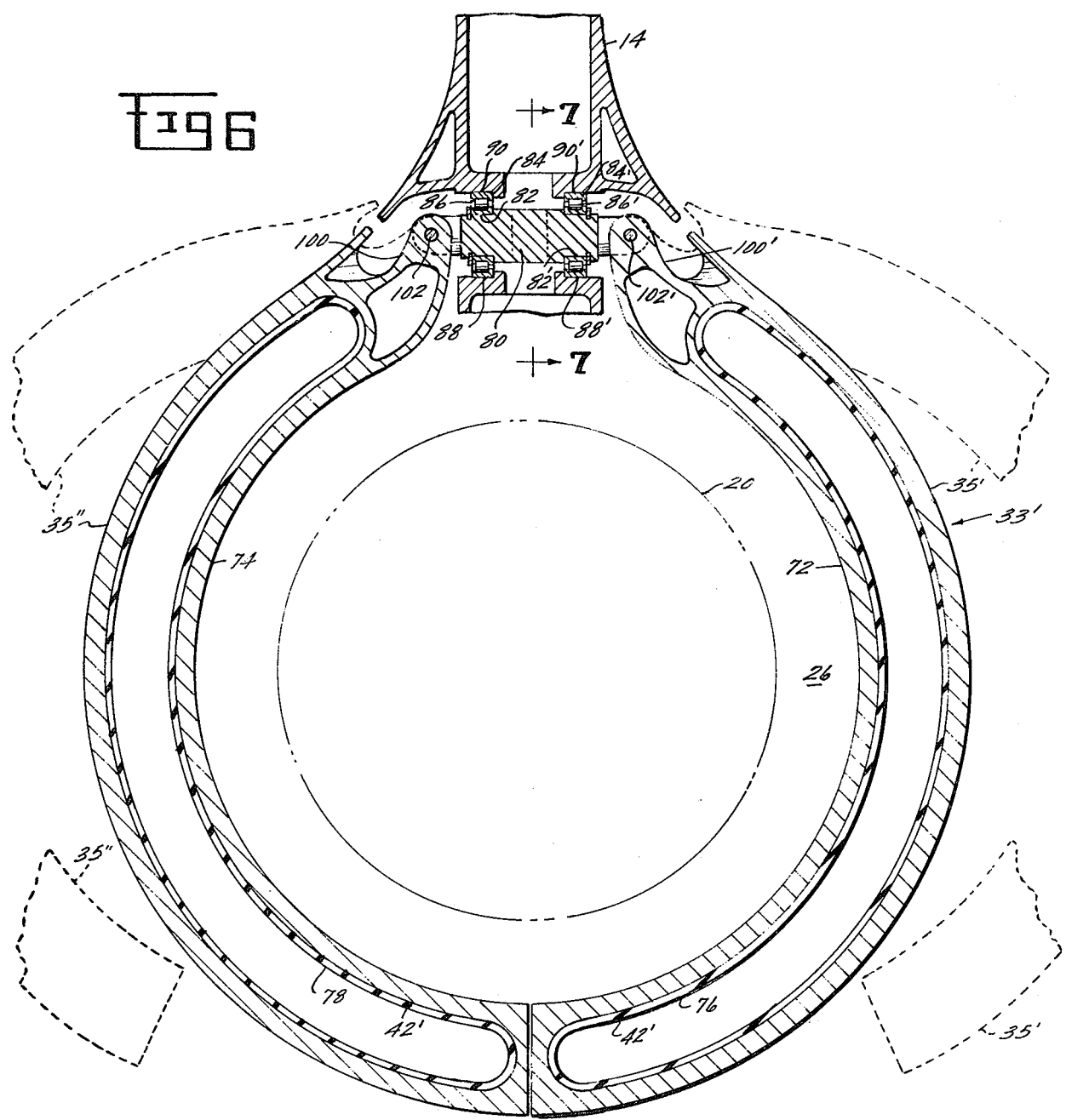
FIG. 6 is a cross-sectional view taken across the lines 6—6 of FIG. 1 showing an alternate embodiment thereof.

Referring first to FIG. 1, there is shown an aircraft structure such as a wing 10 which supports a turbofan engine 12, having a concentric front fan 22 of the variable pitch type wherein the engine is supported by means of a conventional strut or pylon structure 14. Downstream of the variable pitch fan 22 there is provided a core engine 16 which discharges a motive fluid through a nozzle 18 so as to provide forward propulsive thrust. The core engine 16 is enclosed within a casing 20 in a conventional manner including an inlet 27 in serial flow relationship with a compressor, a combustor, a first turbine means for driving the compressor, and a second turbine means for driving the fan 22, all of which are conventional and therefore not labelled in the drawing.

The fan 22 is concentric with the core engine 16 and includes a plurality of circumferentially spaced apart variable pitch fan blades 23 extending radially outward from an inner hub 25 to an outer cowling 24. Cowling 24 is larger in diameter than the core engine 16 and spaced apart therefrom to form a bypass duct 26 which provides for additional thrust by movement of relatively large masses of low velocity air in a well known manner. The fan 22 may be of a high bypass ratio type whereby the mass of air passing through the fan may be as high as 8 or greater times the amount of airflow through the core engine 16. The fan 22 is thus used to propel air through the duct 26 as well as to supercharge the engine 16.

As previously discussed, the variable pitch fan 22 provides for increased performance efficiency by adjusting the fan speed to meet different engine operating requirements as dictated by the flight mission. Thus, the variable pitch fan blades 23 permit the fan speed to be varied without changing the rotational speed of the core engine 16. Such blading may even be varied to reverse pitch or negative pitch for complete thrust reversal after landing whereby the direction of the flow of air in the duct 26 is reversed. Due to the high bypass ratio of the fan flow, it may be necessary only to reverse the direction of the fan flow for satisfactory braking, whereupon the core engine exhaust can then be ignored.

When the variable pitch fan blades 23 of the fan 22 are in reverse pitch for braking, the airflow which is drawn into the bypass duct 26 through the annular rear entry, as generally defined between the cowling 24 and the core engine casing 20, may suffer some degree of distortion due to the turning of the airflow into the core engine compressor which still requires an inlet airflow for continued operation of the core engine. This distortion is due to the fact that the reverse pitch airflow passing forwardly along the bypass duct 26 must turn through 180° in order to enter the core engine inlet 27. As a direct consequence of such distorted flow occurring when the air passes forwardly along the bypass duct 26, there is an aerodynamic restricting or nozzle effect produced in the airflow before it reaches the variable pitch fan blades 23. Since the entry to the fan is so restricted, the reverse thrust produced by the variable pitch fan is less than it would otherwise be if this aerodynamic restriction could be eliminated or reduced.

Referring now to FIG. 2, in conjunction with FIG. 1, the cowling 24 can be seen to include a forward fixed portion 28 and an aft variable portion 30 comprising a plurality of circumferentially spaced apart hinged nozzle flaps 32 which may be opened to accommodate a maximum airflow through the bypass duct 26 during takeoff and climb to altitude after which the nozzle flaps 32 may be rotated into the closed position to accommodate the reduced airflow through the bypass duct during the cruise portion of the flight. Airflow sealing between the nozzle flaps 32 may be accomplished by a plurality of interleaved seal elements 39 as shown in FIG. 3.

Nozzle flaps 32 are connected to an axially translatable unison ring 33 by means of a plurality of circumferentially spaced apart hinges or pins 36. The unison ring 33 may include an inner annular wall member 34 spaced apart from an outer annular wall member 35 interconnected by an integral forward end wall member 38, the generally concave face of which sealingly engages the generally convex aft end 40 of the forward fixed portion 28 of the cowling. Intermediate the inner and outer wall members 34, 35, there is provided an inflatable bladder 42 of generally circular cross-section, in abutting relation with the generally concave side of still another annular wall member 44 which extends radially between the inner and outer wall members 34 and 35. An actuating ring section 46 is slidably disposed for axial translation between the inner and outer wall members 34, 35 and includes a generally concave surface 48 for engaging the aft side of the inflatable bladder 42. Extending rearwardly from the actuating ring section 46 is a circumferential flange 50 terminating in a circumferential abutment face 52, the purpose of which will become obvious from the following discussion.

An annular ring section 54 is maintained in spaced relation intermediate the inner and outer wall members 34, 35 by a plurality of circumferentially spaced apart radial flange members 37, which integrally connect to the inner wall member 34 and coincidentally retain the pins 36 for rotation relative to the unison ring 33. The annular ring section 54 includes a forward annular abutment face 58 which operates as a stop for minimum nozzle area position and an aft annular abutment face 60 which operates as a stop for maximum nozzle area position as will be fully described in the following discussion.

The unison ring 33 may be retained for axial translation relative to the fixed portion 28 of the cowling 24 by a plurality of circumferentially spaced apart longitudinal guide and support struts 62. The struts 62 may be of I beam cross-section, as shown in FIG. 2A, so as to be axially translated by a linear actuator 64 along rollers 63, 63' which are rotatably pinned to the fixed portion 28 of the cowling. The linear actuator 64 interconnects the guiding support struts 62 through an actuator piston drive rod 65 and may be of the well known hydraulic type wherein hydraulic fluid is supplied to the actuator from a control source of hydraulic fluid, not shown. Alternatively, the linear actuator could be of the screw jack type driven by a rotating motion from a hydraulic, pneumatic, or electric motor (not shown). The control for either hydraulic or screw jack actuators would be similar to that used to control the variable area of a jet exhaust nozzle and thus would be well known to persons of ordinary skill in the art.

Referring now to FIG. 4, there is shown an air inlet at 66 for the inflatable bladder 42 wherein the air inlet is circumferentially offset from the guide and support struts 62 and may be axially retracted from the downstream end of an air hose or air conduit 68. The air hose 68 receives a flow of pressurized air from a source (not shown) whereby the flow of pressurized air to the inflatable bladder 42 may be selectively controlled by an air valve 70.

During normal engine operation at takeoff and climb to altitude, the airflow through the bypass duct 26 is at a maximum whereupon the hinged nozzle flaps 32 must be rotated outwardly to provide a maximum nozzle area, thus accommodating the increased airflow through the bypass duct 26. This may be accomplished by opening the air valve 70 so as to permit the pressurized airflow within the inflatable bladder 42 to escape overboard. Deflation of the bladder 42 in turn permits the actuating ring section 46 to translate upstream within the inner and outer wall members 34, 35 of the unison ring 33. The actuating ring section 46 is translated upstream by the forward ends, shown generally at 72, of the hinged nozzle flaps 32 which sealingly engage the abutment face 52 of the circumferential flange 50. The individual nozzle flaps 32 are pivoted radially outward about the pins 36 as a direct consequence of the differential air pressure existing between the pressurized airflow in the bypass duct 26 and the ambient airflow outside the cowling 24. As becomes immediately obvious, deflation of the bladder 42 removes any resisting force to outward rotation of the nozzle flaps 32 as would otherwise be provided by engagement of the abutment face 52 with the upstream ends 72 of the nozzle flaps 32. However, as is also readily apparent, an ultimate limit to the outward rotation of the nozzle flaps 32 is provided by the aft abutment face 60 of the annular ring section 54 which sealingly engages the upstream end 72 of the nozzle flaps 32.

Referring back to FIG. 2, there is shown the mode of operation generally assumed during the cruise mode of operation when the airflow through the bypass duct 26 is reduced. The reduced airflow requires that the nozzle flaps 32 be pivoted radially inward to establish a minimum nozzle area, thus maintaining the required forward propulsive thrust. The nozzle flaps 32 may be rotated into the closed position by inflating the bladder 42 with a pressurized airflow controlled by the air valve 70 and furnished by way of the air hose 68 as shown in FIG. 4. Inflation of the bladder 42 operates to translate the ring section 46 rearwardly between the inner and outer wall members 34, 35 of the unison ring 33. Downstream translation of the ring section 46 in turn results in the abutment face 52 of the circumferential flange 50 sealingly engaging the upstream ends 72 of the nozzle flaps 32 so as to rotate the nozzle flaps radially inward about the pins 36. In this manner, the nozzle flaps 32 are forced to pivot radially inward despite the differential pressure existing between the pressurized airflow in the bypass duct 26 and the ambient airflow outside the cowling 24. As becomes readily apparent, ultimate rotation of the nozzle flaps 32 radially inward is determined by the forward abutment face 58 of the ring section 54 which engages the aft side of the ring section 46, terminating rearward translation thereof.

Referring now to FIG. 5, there is shown the mode of operation which may be assumed during landing when the pitch of the fan blades is varied into reverse pitch for braking the associated aircraft. During reverse pitch, the airflow in the bypass duct 26 changes direction whereupon the airflow enters the annulus defined between the rearward end of the cowling 24 and the casing 20 of the core engine 16. The actuator 64 is operated so as to extend the actuator piston drive rod 65 in a rearward direction. An annular space 74 thereupon opens between the generally convex downstream end 40 of the forward fixed portion 28 of the cowling and the generally concave upstream end 38 of the unison ring 33. The annular opening 74 permits an increased amount of air to enter the bypass duct 26 in a reverse direction so that adequate air is readily available for ingestion by the compressor, via the inlet 27, and also so that the air passing forwardly along the bypass duct to the fan is less restricted, thereby improving the reverse thrust capability of the variable pitch fan. Whereas the inflatable bladder is disconnected from the air inlet 66 upon rearward translation of the unison ring 33, there is no force exerted on the upstream ends 72 of the nozzle flaps 32, thereby permitting them to rotate in accordance with the differential air pressures on either side of the flaps. In this manner, increased airflow is admitted to the bypass duct 26 with decreased aerodynamic losses for improved performance efficiency during the reverse thrust mode of operation.

Figure 7:
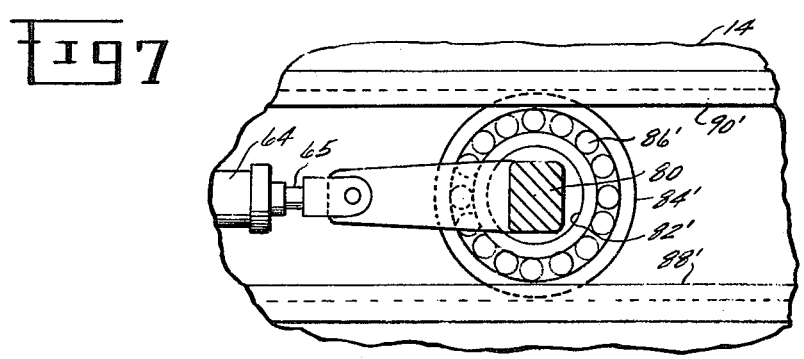
FIG. 7 is a cross-sectional view taken across the lines 7—7 of FIG. 6.

Referring now to FIGS. 6 and 7, there is shown an alternate arrangement for the variable portion of the cowling whereby the cowling may be split in a manner which permits lowering of the core engine 16 for ease of repair and maintenance. The variable portion of the cowling includes a unison ring 33' split into two arcuate sections 72, 74 which respectively retain arcuate bladder sections 76, 78. Two adjacent ends of the arcuate unison ring sections 72, 74 are rotatably pinned to 102, 102' by respective clevises 100, 100' to the opposing ends of an axle rod 80 which is disposed for axial translation relative to the pylon 14. Inner bearing rings or races 82, 82' are respectively fastened in a conventional manner to opposing ends of the axle rod 80 wherein the bearing rings 82, 82' are also respectively disposed for rotation relative to outer bearing rings or races 84, 84' by circumferentially spaced apart rollers 86, 86'. The outer bearing rings 84, 84' are disposed for respective rotation in an axial direction along two spaced apart parallel inner tracks 88, 88' each of which is fixedly connected at opposing ends to the pylon 14. A pair of parallel outer guide tracks 90, 90' also connect to the pylon 14 and respectively engage the outer bearing rings 84, 84' for longitudinal guidance thereof. As becomes readily apparent the unison ring 33' is suitably disposed for axial translation in the aforementioned manner as may be accomplished by the linear actuator 64 interconnecting drive rod 65. In addition the arcuate sections 72, 74 may be swung apart about the pins 102, 102' permitting the core engine 16 to be lowered for ease of repair and maintenance.

Although the invention as herein described is in relation to a front fan high bypass ratio engine, it is also equally applicable to all types of fan powerplants regardless of bypass ratio or location of the fan. In addition, although the fan cowling has not been described as extending completely back to the rear of the core engine, it is readily apparent that the invention is equally applicable to such an installation. Therefore, having described a preferred embodiment of the invention, though not exhaustive of all possible equivalents, what is desired to be secured by letters patent is claimed below.

What is claimed is:
1. A fan cowling for a gas turbofan engine said cowling being spaced apart from a core engine to define an annular bypass duct therebetween and comprising:
   a forward fixed portion;
   an aft variable portion including a unison ring in axial alignment with the fixed portion;
   a plurality of circumferentially spaced apart nozzle flaps disposed to be freely rotatable between limit stops around the aft end of the unison ring such that the differential air pressure existing between the bypass duct airflow and the ambient causes the nozzle flaps to rotate radially outward to a maximum nozzle area position;

an inflatable bladder in engagement with the unison ring; and actuating ring means translatably disposed relative to the unison ring between the bladder and nozzle flaps for translating downstream to engage and rotate the nozzle flaps radially inward upon inflation of the bladder to thereby decrease the exhaust area of the bypass duct and prevent the nozzle flaps from being rotated further radially outward by said differential air pressure.

2. The fan cowling of claim 1 wherein:

the turbofan engine includes a fan of the variable pitch type which may be varied into reverse pitch so as to reverse the normal direction of the airflow through the bypass duct, and further comprising actuator means housed within the fixed portion and drivingly engaging the aft variable portion for translating the aft variable portion apart from the fixed portion to expose an opening therebetween which provides an auxiliary air intake when the fan is placed in a reverse pitch orientation and translating the aft variable portion in an upstream direction to close the auxiliary air intake when the fan is in a forward pitch orientation.

3. The fan cowling of claim 2 wherein:

the unison ring includes an inner wall member spaced apart from an outer wall member interconnected by an integral forward wall member for sealingly engaging the aft end of the fixed portion of the cowling;

the inflatable bladder is disposed intermediate the inner and outer wall members in abutting relation with the unison ring, and the actuating ring means is slidably disposed for axial translation between the inner and outer wall members and includes a rearwardly extending circumferential flange terminating in an abutment face for engagement with the forward ends of the nozzle flaps.

4. The fan cowling of claim 3 including:

a ring section maintained in spaced relation intermediate the inner and outer wall members of the unison ring wherein the ring section has a forward abutment face for engaging the actuating ring means and stopping rearward translation thereof in order to provide a stop for the minimum nozzle area position and an aft abutment face for engaging the forward ends of the nozzle flaps and stopping outward rotation thereof in order to provide a stop for the maximum nozzle area position.

5. The fan cowling of claim 3 wherein:

the forward wall member of the unison ring has a generally concave face for sealingly engaging the aft end of the fixed portion of the cowling which is generally convex, and the inflatable blader is of generally circular cross-section such that the forward side of the bladder engages the generally concave side of a third annular wall member extending radially between the inner and outer wall members of the unison ring and the aft side of the bladder engages a generally concave surface on the actuating ring section.

6. The fan cowling of claim 2 wherein:

the unison ring of the aft variable portion is retained for axial translation relative to the fixed portion of the cowling by a plurality of circumferentially spaced apart longitudinal guide and support struts which may be axially translated relative to the fixed portion of the cowling by the linear actuator means.

7. The fan cowling of claim 2 wherein:

the unison ring of the aft variable portion includes two arcuate sections retaining arcuate bladder sections, each arcuate unison ring section of which is rotatably connected to an axle rod disposed for translation relative to the fixed portion of the cowling, such that the arcuate unison ring sections may be swung apart permitting the core engine to be lowered for ease of repair and maintenance.

8. The fan cowling of claim 2 further comprising:

at least one air inlet for the inflatable bladder, conduit means housed within the fixed portion and in flow communication with the air inlet when the aft variable portion is fully translated in the upstream direction and out of flow communication with the air inlet when the aft variable portion is translated apart from the fixed portion for supplying pressurized air to the bladder.

9. The fan cowling of claim 8 wherein the conduit means further comprises:

valve means for selectively obtruding pressurized airflow to the bladder such that interruption of the pressurized airflow to the bladder causes deflation of the bladder and upstream translation of the actuating ring means to thereby permit the free rotation of the nozzle flaps about the unison ring.

* * * * *